US007974744B2

(12) United States Patent
Doan

(10) Patent No.: US 7,974,744 B2
(45) Date of Patent: Jul. 5, 2011

(54) MULTIPLE TELEMETRY STREAM PARSING AND RECONSTRUCTION SYSTEM

(75) Inventor: Hai Doan, Camarillo, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 550 days.

(21) Appl. No.: 12/112,630

(22) Filed: Apr. 30, 2008

(65) Prior Publication Data

US 2009/0276106 A1    Nov. 5, 2009

(51) Int. Cl.
*G06F 9/44* (2006.01)
(52) U.S. Cl. ..... 701/3; 701/36; 340/870.19; 340/870.01
(58) Field of Classification Search .................. 701/36, 701/3; 340/870.19, 870.01, 855.3, 855.4; 375/368, 111
See application file for complete search history.

(56) References Cited

U.S. PATENT DOCUMENTS

| 5,227,783 A * | 7/1993 | Shaw et al. ............. 340/870.19 |
| 6,078,632 A * | 6/2000 | Cesulka et al. .................. 375/368 |
| 2003/0046061 A1* | 3/2003 | Preston et al. .................... 704/9 |
| 2008/0221745 A1* | 9/2008 | Diamandis et al. ............... 701/3 |

* cited by examiner

*Primary Examiner* — Thomas G Black
*Assistant Examiner* — Marthe Marc Coleman
(74) *Attorney, Agent, or Firm* — Robert R. Lerma; Christopher L. Blackburn

(57) ABSTRACT

A system and method for parsing a set of archived telemetry streams for the purpose of reconstructing the data contained within the set of archived telemetry streams into a newly constructed set of telemetry streams. The newly constructed set of telemetry streams are used as a set of test driver data to evaluate performance in variety of ground based systems. The availability of test drivers produced by the preferred embodiment of the invention shortens the system development time line by allowing an evaluation of hardware and software changes ahead of the actual delivery of vehicle telemetry components, resulting in a reduction of overall program costs.

12 Claims, 5 Drawing Sheets

MULTIPLE TELEMETRY STREAM PARSING AND RECONSTRUCTION SYSTEM

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

BACKGROUND OF THE INVENTION

1. Field of the Invention

The invention generally relates to a telemetry system and method for parsing a set of archived telemetry streams and reconstructing the data contained within the set of archived telemetry streams into a newly constructed set of telemetry streams. The newly constructed set of telemetry streams are used to evaluate the performance of a wide variety of ground based systems when used as test driver data. The availability of test driver data produced by the preferred embodiment of the invention shortens ground system development time lines resulting in a reduction in overall program costs.

2. Description of Related Art

Historically, developers of complex systems require an environment to conduct testing to ascertain performance and specification compliance during different stages of development. The military fields complex systems such as air-to-air missiles, surface-to-air missiles, ballistic missiles, and all types of manned and unmanned aircraft. Commercial entities field all types of manned and unmanned aircraft. Each of these complex systems requires a supportive test environment during the development stages.

Military and commercial test ranges rely heavily on the ability to collect data, collect information, and to retransmit the collected data and information in the form of telemetry streams. Software programs onboard the vehicle under test format selected flight parameters and event data into defined telemetry streams that may be transmitted from the vehicle under test and received by a ground station. The telemetry streams are then processed at the receiving ground station and are transformed into analog and digital data suitable for analysis and performance assessment. The accuracy of the data collection and transformation are evaluated at various development stages of the vehicle's operational flight program and the vehicle's telemetry system development.

Generally, the development of a complex system matures during the course of a development time line and then continues to mature over the life span of the vehicle. Vehicles with long life spans are susceptible to component obsolescence, subsequent modernization, and the ever present upgrading of software. It is the subsequent modernization of hardware and upgrading of software that drive many mature and complex systems back into a test phase.

It is known to automatically generate software code and data files along with a number of auxiliary data files for use with telemetry software. The ability to automatically generate software code and data files is dependent upon a working operational flight program, a telemetry file definition and test input data. One such system is described in a Patent Application Publication No. 2007/0032922, titled as AUTOMATIC GENERATION OF TELEMETRY FLIGHT SOFTWARE ACCOMPANYING SPECIFICATIONS, AND DECODE FILES and is also described in a U.S. Pat. No. 7,099,753, having the same title. What is unknown in the art is the ability to generate a reconstructed set of telemetry data streams from archived sets of telemetry data streams collected during a previously conducted live test, independent of an operational flight program or working telemetry hardware.

One use of the Multiple Telemetry Stream Parsing and Reconstruction System (MTSP) is to provide test data within a telemetry stream to fill a gap in test data that occurs when a vehicle is simultaneously undergoing a telemetry hardware upgrade, a telemetry parameter definition upgrade, and the ground receiving station's software and hardware are adapting to these vehicle changes. When all of these modifications and upgrades are addressed serially in time the vehicle program's schedule is drawn out, overall program risk is shifted to the last testing stage, and any attendant increased program costs are incurred when milestones are missed.

The advantage of the preferred embodiment is that a reconstructed set of telemetry streams containing what appears to the user to be live data conforming to the requirements of the new telemetry system are available to drive ground station systems. The reconstructed live data streams are generated and used to conduct tests independent of the vehicle's operational flight program, independent of the vehicle's telemetry system, and are also used to independently test the changes made at the ground receiving station. In addition to the MTSP, all that is necessary is a set of previously recorded telemetry test data and the new telemetry definition formats. The reconstruction process that generates the reconstructed telemetry streams is accomplished by the MTSP resulting in a shortened development timeline, a shift of risk to an earlier stage of the program, and reducing program costs by allowing development of the vehicle's telemetry hardware and software changes to be performed in parallel with those changes occurring at the ground station. Running live data having known expected parameters through a ground station's software and display suite will uncover any errors induced while upgrading the vehicle telemetry system or changing the ground station software and hardware. The described apparatus and method circumvents the need for actual updated telemetry recordings and allows a recertification of the range safety and range users displays to be performed in parallel.

SUMMARY OF THE INVENTION

Complex military and commercial systems are developed according to a time line that consists of a system definition phase, a system requirements phase, a subsystem development stage, a subsystem test phase, a system development stage and a system test phase. Historically, errors found at the system test phase are the costliest and riskiest to correct. Errors found and corrected at the subsystem test phase save program cost, reduce program risk resulting in a product that matures quickly and is available sooner at a lower cost. The development time line concept is applicable to both new and upgraded commercial systems and to new and upgraded military systems. Generally, upgraded military and commercial systems have telemetry (TM) data from previously conducted tests stored in archives.

The present invention is directed to an apparatus and method that satisfies the need for implementing a comprehensive scheme to playback archived TM data, parse and reconstruct the archived sets of TM streams into entirely new sets of TM streams. The entirely new set of TM streams produced by the present invention will allow a user to reap the benefits of performing system level testing at the subsystem test phase.

Generally, the apparatus is comprised of a TM playback unit that is compatible with the archived TM data tapes and is used to generate a plurality of input TM streams. A hardware patch panel receives the input TM streams and routes the multiple input TM streams to any number of TM data processors. The TM data processor decommutates the input TM streams into frames and subframes of data. Included within the TM processor is a compiled set of software programming instructions that implement a parsing and reconstruction algorithm that parses the decommutated data and then reconstructs the data producing a set of output TM streams. The reconstructed data within the set of output TM streams includes modifications to the scaling value of the data, changes in the rate at which the data appears, changes in location of the data within the stream, and further includes entirely new data.

Generally, the method comprises playing back a prerecorded set of TM streams, routing the prerecorded TM streams to a TM data processor, decommutating the prerecorded TM streams, parsing the data produced in the decommutation step, modifying the parsed data parameters, and then inserting any new data parameters. The final step in the method is to merge the modified parsed data, the new data, any original data parameters into a newly constructed set of TM streams for output and recording.

A recording of the constructed set of TM streams produced as a result of the apparatus and method is available for use as a test driver to perform an evaluation of software and hardware changes made to a ground processing station. When the constructed set of TM streams are used as a test driver an improvement in the development time line for a system is realized by identifying performance issues with the ground station or other equipment at an earlier stage of development.

BRIEF DESCRIPTION OF THE DRAWINGS

The features described above, other features, aspects, and advantages of the present invention will become better understood with regard to the following description, appended claims, and accompanying drawings where:

DETAILED DESCRIPTION OF THE PREFERRED EMBODIMENT

Figure 1:
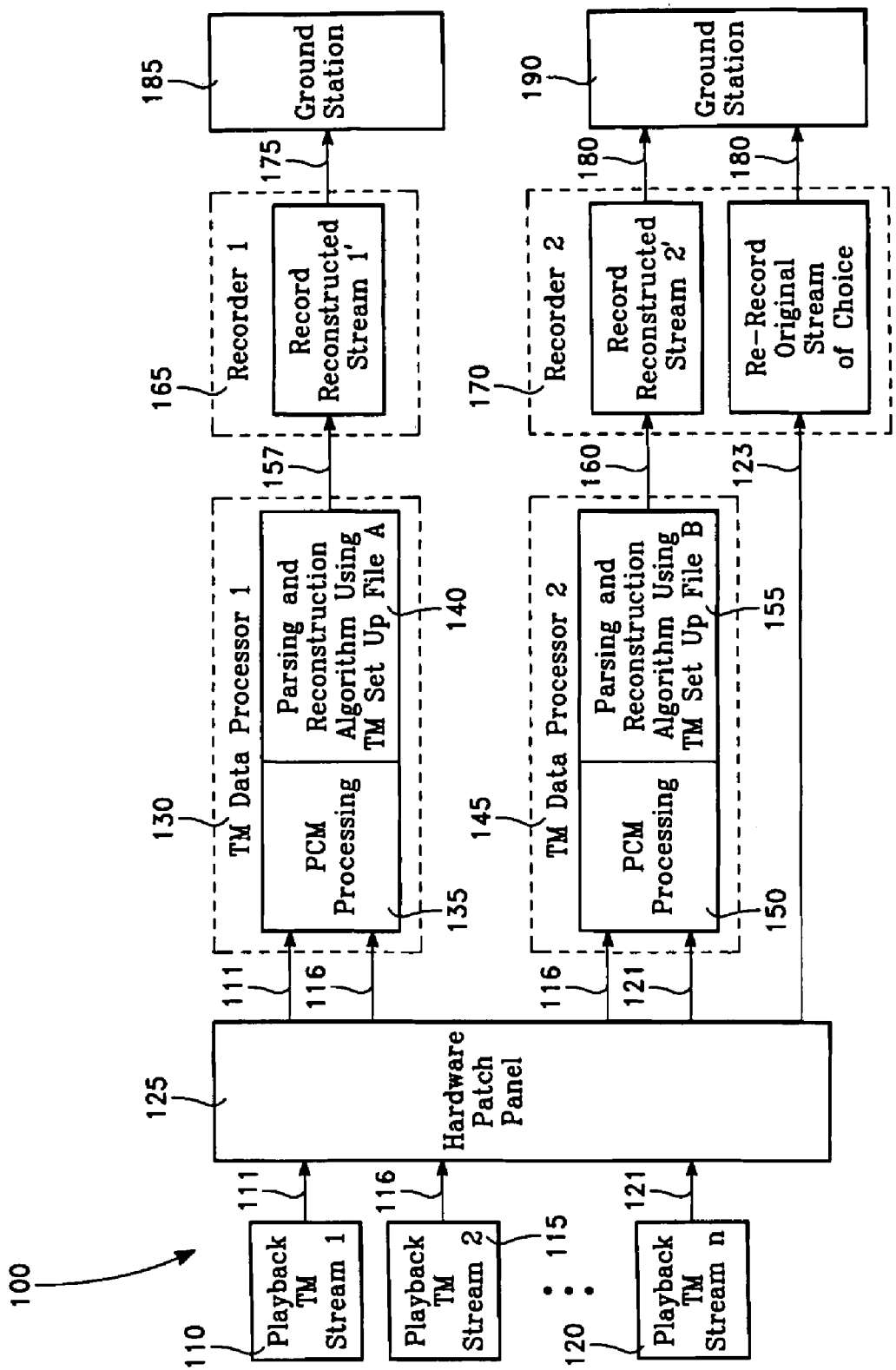
FIG. 1 is a high level functional block diagram of the preferred embodiment showing the major functions of the Multiple Telemetry Stream Parsing and Reconstruction System (MTSP).

Referring to FIG. 1, shown is a high level functional block diagram 100 generally describing the major functions of the Multiple Telemetry Stream Parsing and Reconstruction System (MTSP). One or more playback units (110, 115, and 120) are used to play back the archived telemetry (TM) streams. Each of the playback units (110, 115, and 120) are connected to a hardware patch panel 125 using a barrel nut connector (BNC) patch cable. The hardware patch panel 125 is used to route the playback TM streams (111, 116 and 121) to any one of a number of TM data processors (130 and 145). The hardware patch panel 125 is used to also used to route a playback TM stream 123 directly to a recorder 170.

In the preferred embodiment the TM data processor (130 and 145) is manufactured by the Acroamatics Telemetry Systems Corporation. Each TM data processor (130 and 145) is comprised of a specialized front end (135 and 150) for processing multiple types of TM data formats and a computer processor (140 and 155) in communication with the specialized front end through a computer memory.

In the preferred embodiment the playback TM streams (111, 116, and 123) are in a Pulse Code Modulation (PCM) format having major frames and subcommutated minor frames. The preferred TM data processor (130 and 145) is manufactured by the Acroamatics Telemetry Systems Corporation. The Acroamatics TM data processor (130 and 145) is a standard VME chassis with slots for accepting a number of VME compatible input cards and assorted dedicated TM processing cards. Specifically, the Acroamatics TM data processor (Model 2222V) is configured with an input card to perform PCM bit synchronization (Model 501 VA) for up to eight TM streams 309, a PCM frame synchronizer and decommutation card (Model 502V) 310, a time code generator translator card (Model 503V) 321, a data distribution interface card (Model 504VA) 325, a digital to analog conversion card (Model 506V) 345, and most importantly a simulator reconstruction card (Model 512V) 322. The processed telemetry output (157 and 160) of the Acroamatics TM data processors (130 and 145) and any unprocessed telemetry stream 123 are routed to recording units (165 and 170) for recording and data playback (175 and 180) to a ground receiving station (185 and 190). The storage media employed by the recording units (165 and 170) is either magnetic tape, computer memory, or other mass media storage formats. The data playback (175 and 180) to the ground receiving station (185 and 190) allows a user to ascertain the proper operation of hardware and software changes made to the ground receiving station (185 and 190), which in turn shortens the development timeline resulting in saving program funding.

Figure 2:
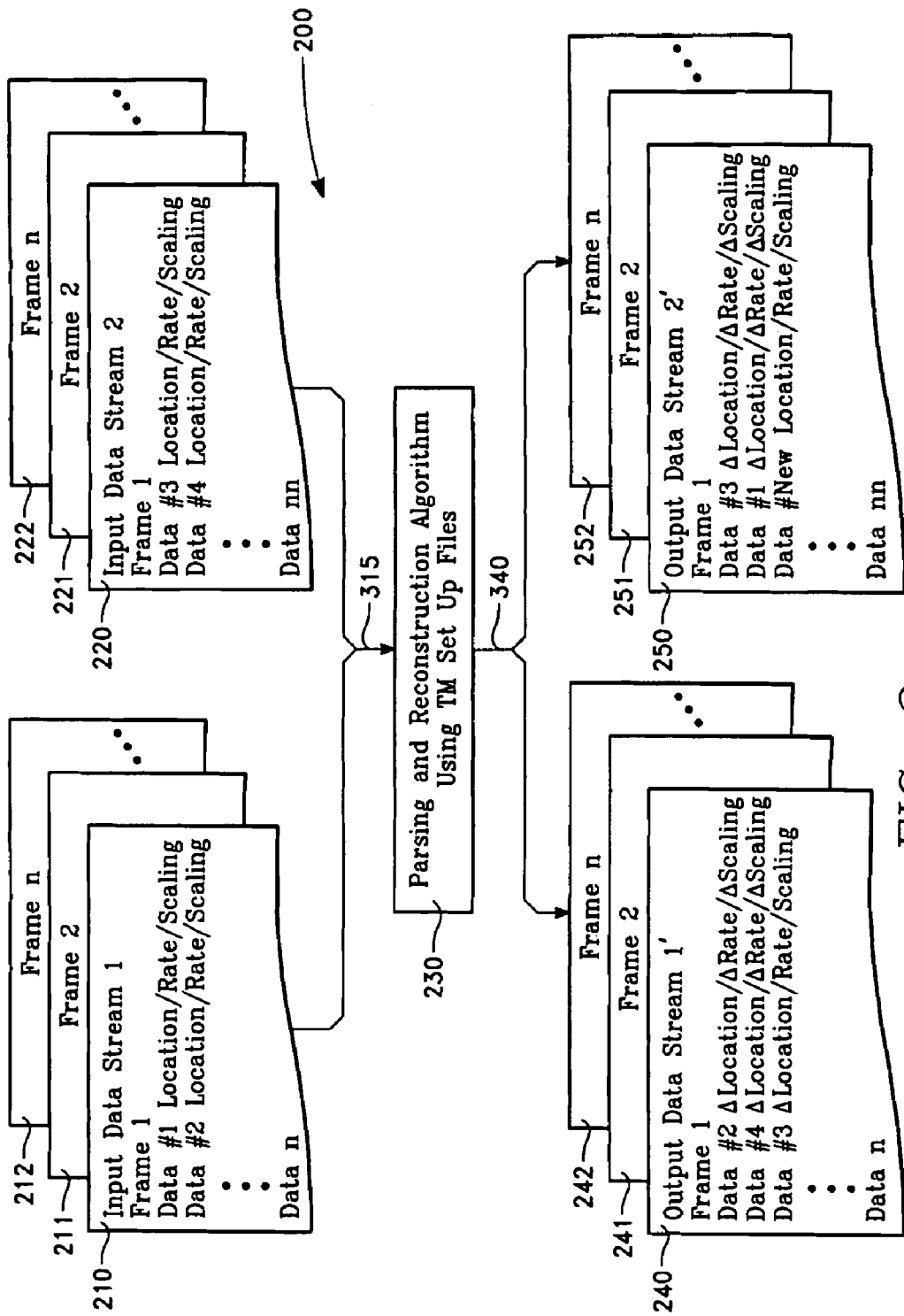
FIG. 2 is a depiction of the data format for the input telemetry (TM) streams, the defined parsing and reconstruction process, and an example of the newly constructed output data format for the output TM streams. Producing the output data format is the objective of the preferred embodiment.
Figure 3:
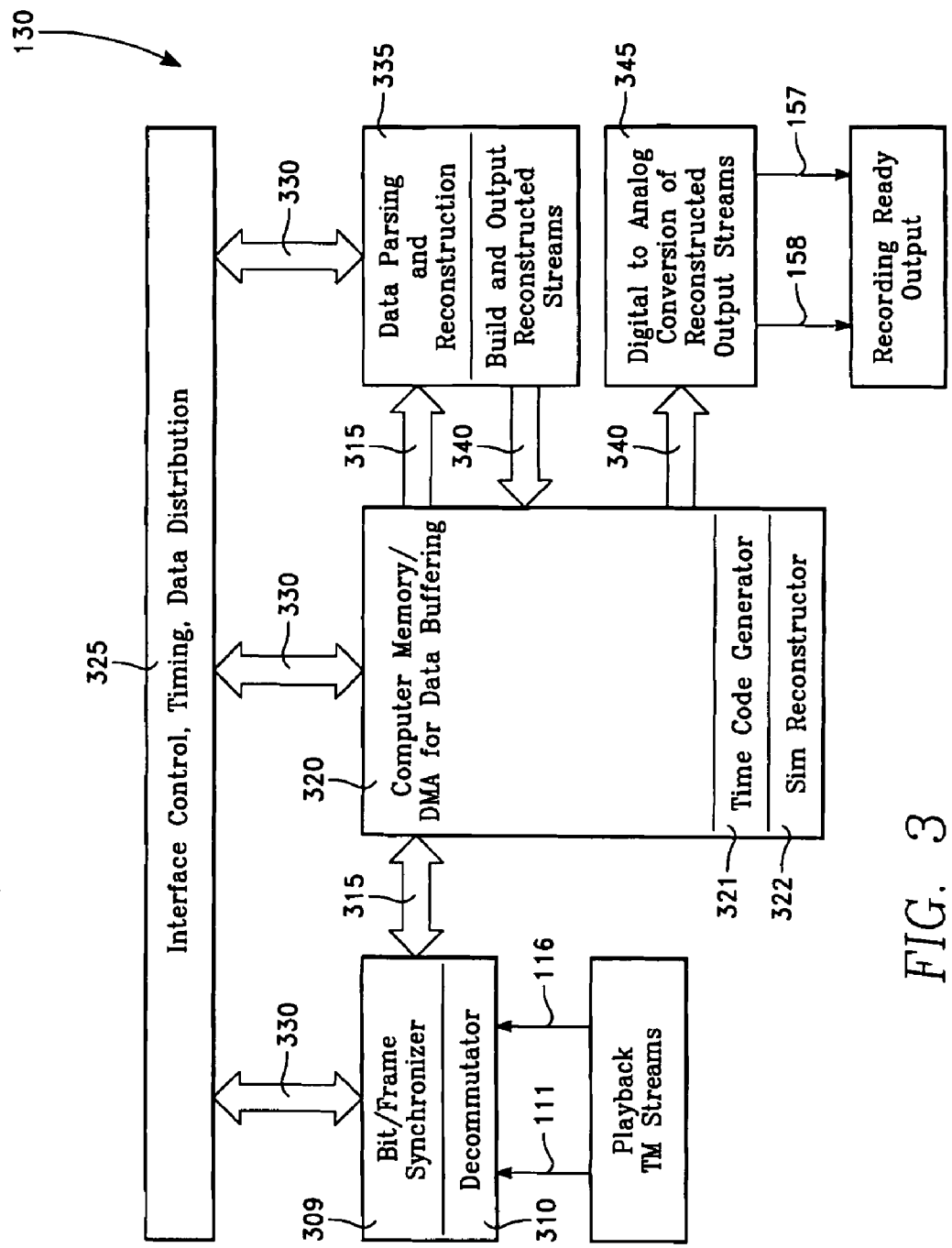
FIG. 3 is a functional block diagram depicting the interfaces and functions internal to the TM data processor for the preferred embodiment.

FIG. 2 is a representation 200 of the decommutated and buffered input data for stream(1) (210-212) and stream(2) (220-222), the parsing and reconstruction processing step 230, and the generalized output data format for reconstructed stream(1') (240-242) or a reconstructed stream(2') (250-252) for the preferred embodiment. Only one processed digital output stream is available from each TM data processor (130 and 145). FIG. 2 depicts what appears to be a parallel set of output data streams (240-242 and 250-252) but in reality is a depiction of the possible data element changes in any single reconstructed telemetry stream. FIG. 3 is a functional block diagram describing the interfaces and functions internal to the Acroamatics TM data processor (130 and 145). One skilled in the arts may reference both FIGS. 2 and 3 as the basis for understanding the following discussion detailing the critical aspects of the preferred embodiment.

Specifically, playback TM streams (111 and 116) are synchronized and decommutated 310 producing TM frame data 315 consisting of TM frames sequenced in time and numbered sequentially (210-212 and 220-222). A frame 210 is populated with a plurality of data words where each data word is associated with a unique location within the frame, a value, a defined data rate, and a defined word length that is related to a scaling factor. Other pieces of information are capable of representation within the frame 210 such as frame identification counters, frame header information, subframe identifiers, and timing information. Writing the synchronized and decommutated TM frame data 315 to computer memory 320 is performed under the control of the interface control and timing function 325 using control and timing signals 330.

Once the TM frame data 315 is resident in computer memory 320 it is accessible by the data parsing and reconstruction function 335 for subsequent processing by the Parsing and Reconstruction Algorithm 230. The output of the Parsing and Reconstruction Algorithm 230 is a reconstructed output TM stream having a plurality of TM frames sequenced in time and numbered sequentially (240-242 or 250-252). A frame 240 is populated with a plurality of data words that may or may not match the original data contained in the input TM frame data 315. The Parsing and Reconstruction Algorithm 230 performs the critical feature of the preferred embodiment that manipulates data word locations within the frame or from frame to frame, modifies the data value, redefines the data rate, and redefines the word length that determines the scaling factor. Other pieces of information susceptible to manipulation are frame identification counters, frame header information, subframe identifiers, and timing information. The output of the parsing and reconstruction function 335 is an output digital TM stream 340. Writing the output digital TM stream 340 of the Parsing and Reconstruction Algorithm 230 to computer memory 320 is performed under the control of the interface control and timing function 325 using control and timing signals 330. The output digital TM stream 340 is stored in computer memory 320 and made accessible to a digital to analog conversion function 345. The digital to analog conversion function 345 converts the output digital TM stream 340 retrieved from computer memory 320 to an analog signal 157 suitable for recording on an analog recorder. In another embodiment, the output digital TM stream 340 is stored in computer memory 320 then output directly to a digital recorder (FIG. 1, items 165 and 170).

The above discussion for FIGS. 2 and 3 is applicable to any number of Acroamatics TM Data Processors. Any number of input TM data streams may be coupled to any number of Acroamatics TM Data Processors that manipulate, reconstruct, and produce a new TM output stream that is capable of routing to any designated recorder.

Figure 4:
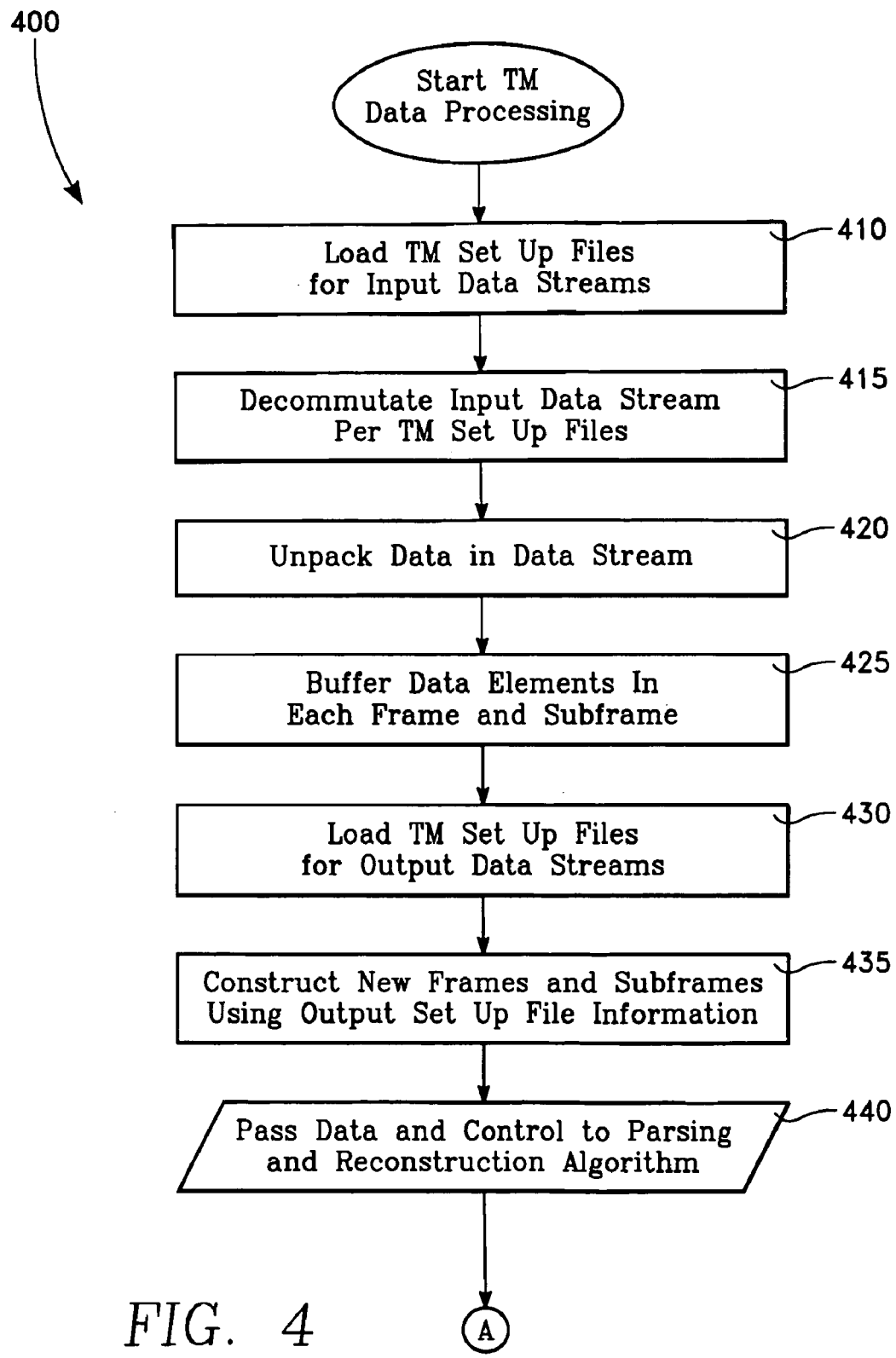
FIG. 4 is a flowchart depicting the processing steps performed prior to executing the parsing and reconstruction algorithm.
Figure 4A:
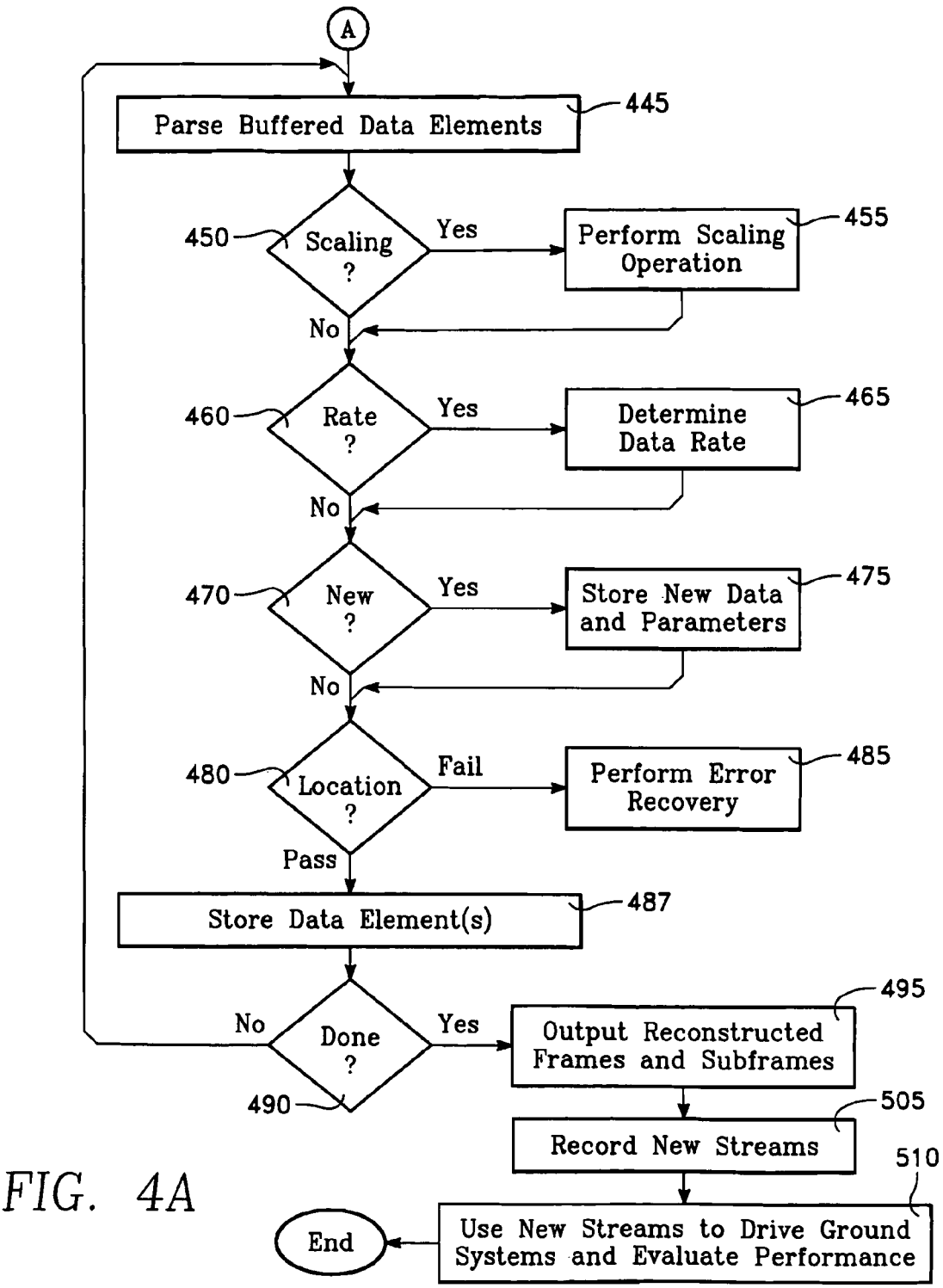
FIG. 4a is a continuation of the flowchart of FIG. 4 and further depicts the steps of the parsing and reconstruction algorithm as well as applying the output TM streams as test drivers to evaluate the operation of a ground station.

FIGS. 4 and 4a, describe of the preferred steps 400 for producing the new TM output streams and applying the new TM output streams as test drivers to assess performance of a ground station that has undergone changes to hardware or to software.

Referring to FIG. 4, the input TM Set Up files are loaded from computer memory (FIG. 3, item 320) into the PCM processor (FIG. 1, item 135) in step 410. The TM Set Up files describe the format of the data relative to the number of TM frames, subframes, word location and word content (FIG. 2, 210) and serve as the key to making the otherwise unintelligible stream of buffered digital data intelligible. The decommutated data produced in step 415 is then unpacked (step 420) according to the input TM Set Up files and the unpacked data is buffered in computer memory at step 425.

The output TM Set Up files are loaded into computer memory in step 430. The output TM Set Up files serve the same purpose as the input TM Set Up files. Here, the output TM Set Up files provide the template for constructing the new major and minor subframes (step 435). The initial data content of the new major and minor subframes (step 435) consists of zeros written to all bit locations. The output TM Set Up files also define the modifications for scaling a data word, changing the rate of a data word, defining the changed location of a data word, and providing the content of any data that is to be inserted into the new output TM stream (FIG. 3, item 340).

Just as every unique input TM stream requires an input TM Set Up file, every unique output TM stream requires an output TM Set Up file. Accurately preparing all of the TM Set up files is critical in building a useful output TM stream. The information to build an accurate TM Set Up file is specific to the telemetry specification document that defines the content of each telemetry stream and is system dependent. The telemetry specification documents for the input and output telemetry streams must be strictly adhered to when building the Set Up files.

At step 440 the Parsing and Reconstruction Algorithm is passed the structure for the frames and subframes produced in step 435 with algorithm execution turning to populating the data fields. Referring to FIG. 4a, the process of populating the data fields begins by first parsing (step 445) the unpacked data that is buffered in computer memory at step 425. Parsing (step 445) is the act of systematically extracting data from the unpacked data residing in buffered computer memory (step 425).

Generally, the parsed data is then subjected to a number of checks (steps 450, 460, 470, and 480) that determine how the parsed data is to be handled (steps 455, 465, 475, and 485). At the conclusion of the checks (steps 450, 460, 470, and 480) and modification steps (steps 455, 465, 475, and 485) the parsed data is then written into the frame and subframe structure produced in step 435 according to the output TM Set Up file. The populated frames and subframes (step 495) now contain the reconstructed digital TM stream ready for output (step 495) and recording (step 505). The product of the recording (step 505) is then ready for use as a test driver data set to assess ground system performance (step 510).

Specifically, the parsed data (step 445) is a single data word, or a section of a single data word or multiple data words. The parsed data (step 445) is subjected to the first check (step 450) to determine whether a scaling operation is required. A scaling operation is defined as reformatting the parsed data to fit into a different number of bits or to fit into a different number of words. The first check (step 450) is performed by comparing the definition of the parsed data bit field as defined in the input TM Set Up file to the definition of a corresponding bit field in the output TM Set Up file. When the comparison results in a determination that the length of the bit field is unchanged no scaling modification (step 455) is made and the algorithm execution proceeds to the next check (step 460). When the comparison determines that a change in the total number of bits (a change in the bit field) is necessary the parsed data is modified (step 455). The parsed data modification (step 455) is performed by dividing the value of the parsed data by the number of bits in the new bit field resulting in a new scaling factor.

The next check performed is a data rate check (step 460). The data rate check (step 460) is performed by comparing the definition of the data rate for the parsed data as defined in the input TM Set Up file to the definition of the corresponding data rate in the output TM Set Up file. When the comparison results in a determination that the data rate is unchanged no data rate modification (step 465) is made and the algorithm execution proceeds to the next check (step 470). When the comparison determines that a change in the data rate is necessary the data rate of the parsed data is modified (step 465). The data rate for the parsed data is modified (step 455) by determining the number of occurrences of the parsed data in the newly constructed frames or subframes, FIG. 2, 240. The number of occurrences may either increase or decrease. With the number of occurrences determined the data rate may be defined (step 465) and modified accordingly. At this point in the algorithm, both a scaling operation (step 455) and a data rate change (step 465) may be applicable.

The next check performed is a new data check (step 470). The new data check (step 470) is performed by comparing the definition of the parsed data as defined in the input TM Set Up file to the definition of the data in the corresponding position in the output TM Set Up file. When the comparison (step 470) results in a determination that the word definition defines new data the value, data rate, and scaling factor of the new data are stored in memory (step 475).

At this point in the algorithm the parsed data may be scaled (step 455), be subjected to a data rate change (step 465), or may be identified as new data (step 475) or may fail all of the checks (steps 450, 460, and 470). In the event that all of the checks fail then the original parsed data is to retain all of its properties including its location within the frame and subframe. When the comparison (step 470) determines that no new data is present the algorithm execution performs a location check (step 480).

To avoid overwriting already allocated data fields it is necessary for the algorithm to maintain a location record for all the modified and original data. The location check (step 480) is performed to ensure that only one piece of data is written to every bit location in the frame and subframe and that the correct data is written to every location. If the location check passes then the parsed data in its modified or original state is stored (step 487) in the constructed frames and subframes resident in computer memory (FIG. 3, 320). If the location check fails then an error recovery scheme (step 485) is performed.

In the preferred embodiment the error recovery algorithm (step 485) results in another attempt to build the major and minor frame by repeating the algorithm beginning at step 445. If repeating the algorithm results in the same error the operator is notified that there is a conflict in the TM Set Up files and should verify the implementation of the TM Set Up files. In the event that a different error occurs then a synchronization problem may be present and is addressed accordingly.

A check (step 490) is then made to determine if all of the parsed data has been evaluated. If data remains for parsing then the algorithm is directed to step 454 and more data is processed. Once all of the data has been parsed then the reconstructed frames and subframes are output (step 495) for recording (step 505). The recorded data is then played back to the appropriate ground system components and ground system performance is evaluated.

The algorithms described herein may be programmed in any suitable programming language for operation on compatible TM data processing computers and other computer processing hardware. The algorithm for the preferred embodiment is loaded onto a computer readable medium which may include, but are not limited to, memory disks, flash memory devices, optically read media, and mass storage devices.

One skilled in the art may adapt the applicant's invention to any TM data processing platform or any compatible playback and recording units. Input signals and output signals used by the MTSP may be analog, digital, PCM or any other TM data format, such as but not limited to, PAM, NRZL, PAL, frequency shift key or video.

Although the present invention has been described in considerable detail with references to certain preferred versions thereof, other versions are possible. For example, the preferred embodiment refers to a VME based system but is readily adaptable to a Personal Computer Interface (PCI) based system, or the like. Another example of a variation to the preferred embodiment is to convert the internal circuits of the telemetry data processor (130 and 145) into external devices. One skilled in the art can convert the internal bit synchronizer and decommutation features (309 and 310) into devices that operate externally to the TM data processor (130 and 145) to produce the same reconstructed telemetry stream.

Therefore, the spirit and scope of the appended claims should not be limited to the description of the preferred versions contained herein.

What is claimed is:

1. A computer program directly loadable into an internal memory of a telemetry processing computer, comprising a program code for parsing and reconstructing a plurality of telemetry streams, wherein the program code comprises sets of instructions for:

loading an input set up file into a first computer memory;
reading said input set up file;
buffering in a second computer memory a decommutated data set, wherein said decommutated data set includes information contained within said plurality of telemetry streams;
unpacking said decommutated data set into a first data element set, wherein said first data element set is stored in a second computer memory,
loading an output set up file into a third computer memory;
reading said output set up file;
constructing a new frame and a new subframe using a definition contained within said output set up file, wherein said new frame and said new subframe are stored in a fourth computer memory;
executing a parsing and reconstruction program, said parsing and reconstruction program outputting a second data element set, wherein said second data element set is a reconstructed version of said first data element set, and said second data element set is stored in a fifth computer memory;
operating an error recovery program in the presence of a data location conflict, wherein said data location conflict exists when a subsequent member of said second data element set overwrites a previously stored member of said second data element set already occupying said fifth computer memory;
producing a reconstructed telemetry stream using said reconstructed version of said first data element set; and
routing said reconstructed telemetry stream to a sixth computer memory.

2. The computer program of claim 1, wherein said parsing and reconstruction program further comprises the steps of:
parsing said first data element set into a plurality of discrete words;
evaluating each of said plurality of discrete words for compliance with a word definition as defined in said output set up file;
modifying each of said plurality of discrete words according to said output set up file producing said second data element set;
storing said second data element set in said fifth computer memory; and
repeating said parsing, said evaluating, said modifying and said storing steps until an end of said first data element set is reached.

3. The computer program of claim 1, wherein said parsing and reconstruction program further comprises the steps of:
parsing said first data element set into a plurality of discrete words;
adapting each of said plurality of discrete words to a scaling definition as defined in said output set up file to produce a scaled adapted data element;
adapting each of said plurality of discrete words to a rate definition as defined in said output set up file to produce a rate adapted data element;

adapting each of said plurality of discrete words to a new parameter definition as defined in said output set up file to produce a new data element; and comparing a first location of each of said plurality of discrete words to a second location, wherein said second location is defined in said output set up file.

4. The computer program of claim 3, wherein said parsing and reconstruction program further comprises the step of inserting said new data element into said second data element set wherein said new data element is not present within said first data element set.

5. The computer program of claim 1, wherein said error recovery program further comprises the steps of:
determining that a memory location conflict exists;
repeating an execution of said parsing and reconstruction algorithm;
evaluating the results of said second step for a repeat of said memory location conflict; and
declaring an error condition when said repeat of said memory conflict exists.

6. A method of assessing the operation of a ground receiving station comprising the steps:
playing back an archived telemetry data set producing a plurality of archived playback telemetry streams;
patching said plurality of archived playback telemetry streams to a telemetry data processor;
loading an input set up file into a first computer memory of said telemetry data processor;
reading said input set up file;
buffering in a second computer memory a decommutated data set, wherein said decommutated data set is decommutated according to said input set up file;
unpacking said decommutated data set into a first data element set, loading an output set up file into a third computer memory of said telemetry data processor;
reading said output set up file;
constructing a new frame and a new subframe using a definition contained within said output set up file;
executing a parsing and reconstruction program, said parsing and reconstruction program accepting as an input said first data element set, said parsing and reconstruction program outputting a second data element set, wherein said second data element set includes a reconstructed version of said first data element set;
storing said second data element set in a fourth computer memory of said telemetry data processor;
initiating an error recovery program in the presence of a data location conflict;
producing a plurality of reconstructed telemetry streams using said reconstructed version of said first data element set, using said new frame, and using said new subframe, wherein said plurality of reconstructed telemetry streams are stored in a fifth computer memory of said telemetry data processor;
routing said plurality of reconstructed telemetry streams to a sixth computer memory of said telemetry data processor;
recording said plurality of reconstructed telemetry streams;
playing back a recording of said plurality of reconstructed telemetry streams, wherein a playback of said recording produces a test data set;
observing a response to said playback of said recording in a set of ground station equipment as said test data set interacts with said set of ground station equipment resulting in an observation assessment; and evaluating said observation assessment to determine a performance of said ground station equipment.

7. The method of claim 6, wherein said error recovery program further comprises the steps of:
determining that a memory location conflict exists, wherein said memory location conflict exists when said fourth computer memory is overwritten;
repeating an execution of said parsing and reconstruction algorithm;
evaluating the results of said second step for said memory location conflict; and
declaring an error condition when said memory conflict exists.

8. The method of claim 6, wherein said parsing and reconstruction program further comprises the steps of:
parsing said first data element set into a plurality of discrete words;
evaluating each of said plurality of discrete words for compliance with a word definition as defined in said output set up file;
modifying each of said plurality of discrete words according to said output set up file producing said second data element set;
storing said second data element set; and
repeating said parsing, said evaluating, said modifying and said storing steps until an end of said first data element set is reached.

9. The method of claim 6, wherein said parsing and reconstruction program further comprises the step of inserting a new data element into said second data element set wherein said new data element is not present within said first data element set.

10. The method of claim 6 further comprising the step of providing a hardware patch panel a plurality of hardware patch panel output ports, at least one of said plurality of hardware patch panel output ports connected to a recording input port.

11. The method of claim 6 further comprising the steps of:
providing a bit synchronization circuit, said bit synchronization circuit accepting a playback data stream, wherein said bit synchronization circuit produces a plurality of synchronized frames and a plurality of synchronized subframes contained within said playback data stream;
providing a decommutation circuit for producing a decommutated data set, said decommutatation circuit accepting said plurality of synchronized frames and said plurality of synchronized subframes contained within said playback data stream;
providing a time code generator translator circuit for processing an encoded time signal contained within said playback data stream;
providing a simulator reconstruction circuit for producing a reconstructed telemetry stream as defined by a set up file stored in a computer memory within said telemetry processor unit, said simulator reconstruction circuit accepting as an input said decommutated data set; and
providing a digital output circuit for outputting said reconstructed telemetry stream to a recording unit.

12. The method of claim 11 further comprising the steps of:
providing a frame synchronizer circuit for synchronizing a plurality of frames and a plurality of subframes contained within said playback data stream; and
providing a digital to analog conversion circuit for converting said reconstructed telemetry stream from a digital format to an analog format.

* * * * *